Dec. 27, 1960   R. D. RUMSEY   2,966,074
VISCOUS TORSIONAL VIBRATION DAMPER
Filed Oct. 29, 1958
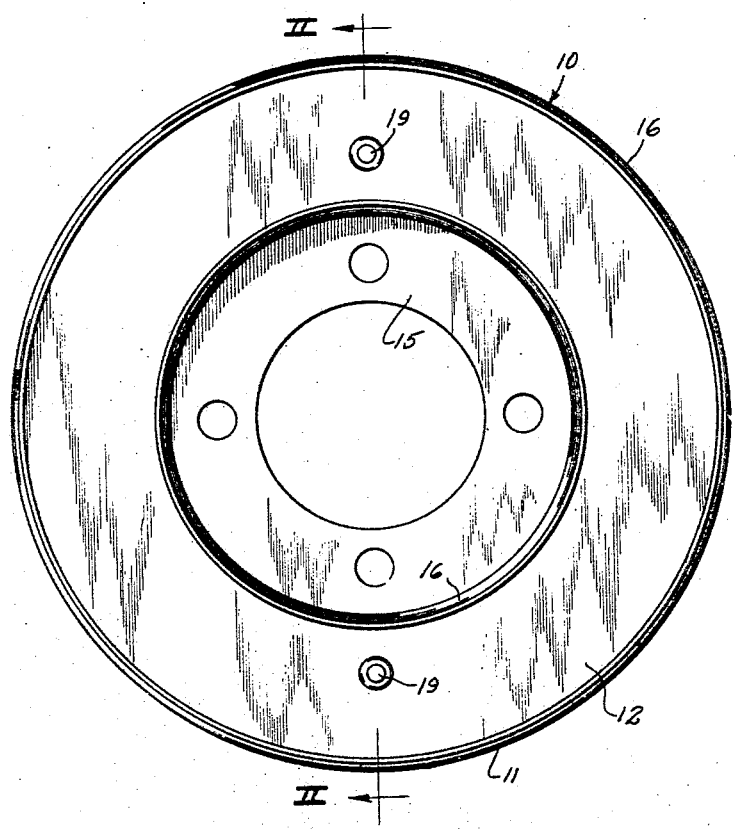
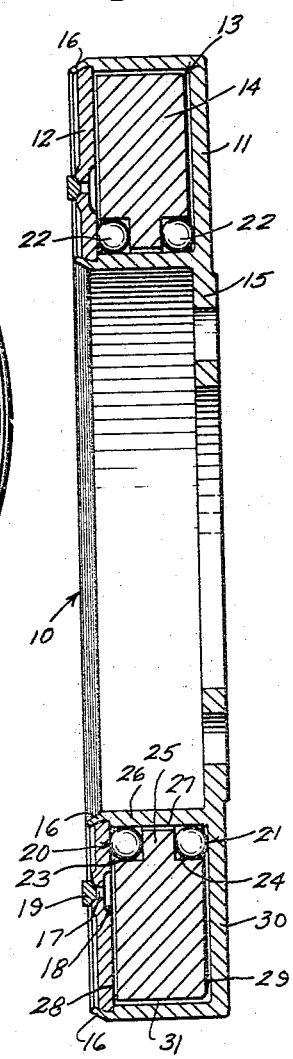
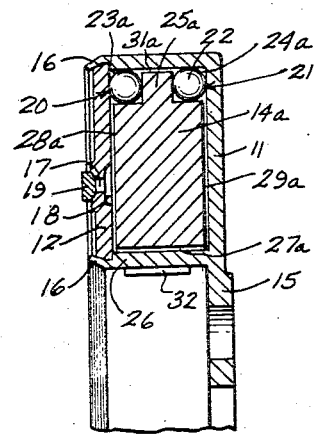
Inventor
Rollin Douglas Rumsey United States Patent Office 2,966,074
Patented Dec. 27, 1960

2,966,074

VISCOUS TORSIONAL VIBRATION DAMPER

Rollin Douglas Rumsey, Buffalo, N.Y., assignor to Houdaille Industries, Inc., Buffalo, N.Y., a corporation of Michigan Filed Oct. 29, 1958, Ser. No. 770,399

11 Claims. (Cl. 74—574)

The present invention relates broadly to the art of vibration damping, and is more particularly concerned with a viscous torsional vibration damper wherein novel means are employed to maintain an inertia ring in axial and radial operative support relative to a housing therefor.

It is known that silicone normally performs effectively as a coupling and lubricating medium between the working surfaces of an inertia ring and housing constructed of ferrous metals. However, particular operating conditions to which the vibration damper is subjected cause the working surfaces to make contact, and in this circumstance the ferrous metals and silicone fluid display an incompatibility, leaving the directly engaging ferrous surfaces in substantially unlubricated condition. A binding of the surfaces occurs, which obviously can not be tolerated in a torsional vibration damper.

Various arrangements have in the past been utilized in an endeavor to overcome this problem. One practical expedient is to plate one or more of the working surfaces with a non-ferrous metal such as cadmium; however, this has not been completely successful for the reason that under those service conditions where the inertia ring or flywheel in operation rubs on the housing, an abrasion and scoring of the cadmium plating occurs and the ferrous surfaces are exposed to direct contact and binding again results. A second approach which has been taken is to locate between the ferrous working surfaces non-ferrous bearing rings formed of bronze or the like. The objections to the latter solution are that the bearings must be precisely machined and the frictional wear characteristics leave something to be desired, again introducing the binding problem. Further, each of the noted expedients has a cost disadvantage in large scale production operations.

It is accordingly an important aim of the present invention to provide a vibration damper constructed in a novel manner to avoid the noted objections and disadvantages of the prior art structures.

Another object of the invention lies in the provision of a new and improved vibration damping construction wherein the ferrous working surfaces of an inertia ring and supporting housing are maintained in axial and radial spaced relation with respect to one another.

Another object of this invention is to provide a novel bearing structure for viscous torsional vibration dampers.

A further object of the invention lies in the provision of axial and radial spacing means between the ferrous working surfaces of an inertia ring and housing therefor, the spacing means being in the form of rotatable elements constructed of a ferrous material.

Other objects and advantages of the invention will become more apparent during the course of the following description, particularly when taken in connection with the accompanying drawings.

In the drawings, wherein like numerals are employed to designate like parts throughout the same:

Figure 1 is a side elevational view of a torsional vibration damper constructed in accordance with the principles of this invention;

Figure 2 is a vertical sectional view taken substantially along the line II—II of Figure 1; and Figure 3 is a similar view, showing a portion of another damping device embodying the features of this invention.

In the general type of vibration damper with which the present invention is concerned the housing therefor is constructed and arranged to be secured concentrically for rotation with a torsionally oscillating or vibrating mass in the form of a driven rotary shaft or crank shaft of a machine, internal combustion engine or the like. An inertia ring or flywheel member is so disposed in spaced, relatively rotatable relation within the housing so that opposing parallel working surfaces of the flywheel and housing are in shear film spaced relation with respect to a viscous silicone fluid in the housing.

In normal rotary operation of the associated shaft, the damper housing rotates fixedly therewith and the viscous silicone fluid coupling between the working surfaces of the flywheel and housing causes the flywheel to rotate with said housing. When the shaft tends to oscillate or vibrate in operation, the same characteristics of the viscous fluid which cause rotation of the flywheel with the housing and the shaft also resist the torsional oscillatory or vibrational movements of the shaft as transmitted through the housing. The force necessary to shear the viscous film between the inertia ring surfaces and the companion work surfaces of the housing is proportional to the relative angular velocity between the inertia ring and the housing work surfaces.

Ideally, all opposing surfaces of the flywheel and the housing should be in spaced relation so that the flywheel essentially floats in the viscous fluid in the housing. However, under many practical conditions movements other than rotary or oscillatory motion must be taken into account, since they tend to cause the flywheel and the housing to move out of the ideal floating relationship and result in frictional inter-engagement of opposing working surfaces.

In accordance with the principles of the present invention, the flywheel and housing are maintained in axial and radial spaced relation under all operating conditions by means of rotatable elements received in annular recesses provided by grooving one diameter of the flywheel. The rotatable elements are preferably formed of a ferrous material, and contrary to the beliefs held by others, bearing engagement of ferrous surfaces does not give rise to deterioration of the viscous damping fluid. While this phenomenon is possibly susceptible to more than one explanation, it would appear that since the rotatable elements are constantly revolving in contact with the damping fluid and make essentially only point engagement with the flywheel and housing, there is insufficient friction between the relatively moving parts to cause deterioration of the silicone fluid.

Referring now to Figures 1 and 2, there is provided a viscous torsional vibration damper generally designated by the numeral 10 and comprising a casing or housing 11 defining with an annular closure disc or plate 12 an annular chamber 13 within which is received an inertia ring or flywheel member 14. The housing 11 is formed with a central hub flange 15 by which it is adapted to be secured to the end of a crank shaft or the like subject to torsional oscillations or vibrations to be damped.

The housing 11 and closure member 12 are in fluid tight relation with respect to one another, which may be effected in any suitable manner, and flange or lip portions 16 on the housing are turned onto the closure member to maintain said member rigid therewith and form a unitary housing structure. It may further be seen that at diametrically opposed locations the closure disc is provided with variable diameter passages 17 providing an inlet for the damping fluid. Each passage has a relatively wider diameter portion 18 in direct communication with the annular chamber 13 to provide a fluid reservoir, while the opposite end of the passage 17 is sealed after fluid insertion by a weldment or the like 19. The weldment 19 may take the form of a ball or the like which is resistance welded to the apertured embossment in the closure plate 12 to effect a fluid tight seal therewith.

The silicone lubricant housed in the annular chamber 13 may be any silicone of sufficient viscosity to be more than a mere lubricating film and less than a layer which would produce only a fluid drag relationship. Commercially available materials perform well for the present purposes, and an exemplary compound is identified as Dow-Corning fluid type 200, having a viscosity rating of approximately 60,000 centistokes at 77° F. Satisfactory results are also obtained with a silicone fluid having a rating of about 30,000 centistokes.

To maintain the flywheel or inertia ring 14 axially spaced from the housing 11, and to further provide bearing means in rolling relation with the flywheel and housing, a pair of axially or laterally spaced annular rows 20 and 21 of rotatable elements 22 are employed located in annular races or grooves 23 and 24, respectively, provided by machining or otherwise forming the inner diameter of the inertia ring 14. The rotatable elements 22 are desirably a commercial grade steel ball, and each ring or row 20 and 21 thereof comprises a sufficient number of balls so that each groove or race 23 and 24 is essentially completely filled with the balls and the rotatable members closely abut one another entirely around each annular groove. It is to be seen that the grooves 23 and 24 are essentially straight wall throughout, and that by making a generally right angular machining cut in the inner diameter of the flywheel 14, a radially inwardly extending tongue portion 25 is formed on the flywheel which axially spaces the ball rows 20 and 21 from each other.

The diameter of each rotatable element 22 and radial depth of the grooves 23 and 24 is such that the tongue portion 25 of the flywheel 14 is maintained radially outwardly of inner annular wall 26 of the housing 11 to define between said portion and said wall an annular space 27 forming a part of the annular chamber 13. Further, the diameter of the balls 22 and axial depth of the races or grooves 23 and 24 are coordinated so that axially extending annular passages 28 and 29 forming a part of the chamber 13 are provided between the flywheel and the closure plate 12 and base portion 30 of the housing 11. In addition, radially outwardly of the flywheel 14 an annular space 31 exists which also is a segment of the annular chamber 13. Accordingly, by provision of the rotatable elements 22 and grooves 23 and 24, each properly sized with respect to one another, the flywheel 14 is completely spaced from the housing 11 and a rubbing or bearing contact therebetween prevented such that deterioration of the silicone fluid is essentially impossible. It is to be borne in mind in this connection that all parts are of ferrous materials, the flywheel 14 being cast iron, the housing 11 formed of malleable iron, the cover 12 normally a steel or iron construction, and the balls 22 a commercial grade steel.

It is to be further noted from reference to Figure 2 that the rotatable elements 22 during their revolutions within the grooves 23 and 24 make essentially only a four point contact with the surrounding iron or steel structure. Specifically, each ball 22 is in bearing relation at a radially inward point with the wall 26 of the housing, at a radially outward point with the flywheel 14, and at axial opposite points with the closure plate 12 or housing wall 30 and the tongue portion 25 of the inertia ring. While the rotatable elements 22 provide sufficient bearing contact to drive the flywheel 14 when the housing 11 is rotated by a crank shaft or the like, only a limited surface portion of the balls and surrounding iron or steel structure are in bearing relation, and it would appear to be for this reason that sufficient friction does not arise to cause deterioration of the silicone fluid and consequent binding of parts.

The annular chamber 13 is normally filled approximately ninety percent of its volume with silicone fluid of the proper viscosity, and rotation of the housing 11 causes the silicone fluid to be centrifugally outwardly directed whereby only a minimum amount of fluid is housed adjacent the annular inner wall 26 of the housing. However, the axially outwardly facing surfaces of the rotatable elements 22, by extending into the annular spaces 28 and 29, are immersed in the fluid and receive a sufficient quantity of the silicone material to be maintained in properly lubricated condition at all times. The silicone fluid is characterized by expansibility at elevated temperatures, such as exist during operation of the damper 10, and accordingly the annular chamber space 27 functions as an expansion compartment for the fluid during temperature rises.

The exemplary embodiment of the invention which has been described is directed to rotatable elements located in grooves formed in part by machining the inner diameter of the flywheel 14. Essentially equal success may be obtained in maintaining the flywheel axially and radially spaced from the housing and cover portion thereof by utilization of the structural arrangement shown in Figure 3. The housing 11 and closure plate 12 are identical and like numerals have been appended thereto. Similarly the rows 20 and 21 of rotatable elements 22 are the same. The inertia ring or flywheel 14a, on the other hand, is machined or otherwise formed to provide along its outer diameter a tongue portion 25a radially inwardly spaced at 31a from the annular outer wall of the housing, the flywheel 14a being axially spaced at 28a from the cover member 12 and axially spaced at 29a from the housing. Further, an annular space 27a is provided between the inertia ring 14a and the inner annular wall 26 of the housing. Grooves or races 23a and 24a are formed by making essentially right angular cuts into the flywheel outer diameter and locating said flywheel in the manner shown surrounded by the housing and closure plate.

As with the first described illustrative embodiment of the invention, the rotatable elements 22 maintain the inertia ring 14a radially and axially spaced with reference to the housing 11 and cover plate 12, and by reason of limited bearing contact with surrounding iron or steel structure, the steel balls 22 do not give rise to sufficient frictional force such that a deterioration of the silicone fluid can occur under even the most strenuous operating conditions. While not at all times required, a balancing slug or piece 32 may be employed along the inner diameter of the housing 11 in either of the forms of Figures 2 and 3 to improve the performance of the damper.

It may now be seen that applicant has provided a viscous torsional vibration damper of new and improved construction in which the flywheel is constantly in axial and radial spaced floating relationship to the housing and frictional inner engagement of the surfaces thereof rendered impossible. Accordingly, there is no likelihood of the damping fluid being subjected to deterioration to cause binding of the parts and eventual damper failure, and the solution to this problem as disclosed herein assures superior damper performance at a lower cost than was possible with the earlier approaches of plating the working surfaces with a non-ferrous material or by providing separate bearing means of a non-ferrous metal. By utilization of a damper structure wherein the bearing means, housing and inertia ring are constructed of high strength ferrous metals, frictional wear is markedly reduced and a longer life assured for the entire damper.

However, it should be appreciated that when the inertia ring 14 is maintained axially and radially spaced from the housing 11 and cover plate 12 by rotatable elements 22, the parts may be constructed of materials other than ferrous metals. Specifically, a bronze inertia ring may be used with a stainless steel housing, or an aluminum or magnesium housing employed with a steel or bronze inertia ring. Also, it is within the contemplation of this invention that plastic balls be used in substitution for steel balls. Materials suitable for this purpose are nylon, rigid polyethylene, phenol formaldehyde and the like. Further, in particular applications combinations of plastic and steel balls may be employed. As for example, alternate plastic and steel balls could be used with the plastic elements of relatively greater diameter to carry normal loads and the steel balls functioning as spacers to carry extremely severe loads. Or this arrangement may be reversed.

Various other modifications may of course be effected in the structures herein disclosed without departing from the novel concepts of the present invention.

I claim as my invention:

1. A viscous torsional vibration damper which comprises, a housing formed therein with an annular chamber uninterrupted along the inner radial wall thereof, an inertia ring received in said housing chamber for rotation with said chamber, said inertia ring being formed along at least one diameter thereof with an annular raised portion providing with the housing a pair of annular axially spaced and generally rectangular pockets, a viscous damping fluid located generally between said ring and said housing, and a plurality of rotatable elements in closely packed relation one to another located in each of the pockets and maintaining said ring and housing relatively axially and radially spaced to prevent frictional engagement therebetween.

2. A viscous torsional vibration damper which comprises, a housing defining therein an annular flywheel chamber uninterrupted along the inner radial wall thereof, a flywheel in said chamber shaped along one diameter to provide with the housing a pair of axially spaced and generally straight walled grooves, a viscous damping fluid insertable in said chamber, and a plurality of ball elements essentially filling each of the grooves and bearing against the flywheel and housing and in essentially four point contact therewith spacing the flywheel from the housing both axially and radially to prevent frictional interengagement and deterioration of the fluid.

3. A viscous torsional vibration damper which comprises, a housing defining therein an annular flywheel chamber, a flywheel in said chamber shaped along one diameter to provide a radially extending tongue portion and ledge portions axially outwardly thereof defining with the housing a pair of axially spaced annular grooves, a viscous damping fluid insertable in said chamber, and a plurality of ball elements closely packed in each of the grooves bearing against the flywheel ledge portions and housing to space the flywheel from the housing both axially and radially to prevent frictional interengagement and deterioration of the fluid.

4. A viscous torsional vibration damper which comprises, a housing defining therein an annular flywheel chamber, a flywheel in said chamber having along one diameter thereof a pair of essentially straight wall recessed surfaces defining with the housing a pair of axially spaced annular races, a viscous damping fluid insertable in said chamber, and a plurality of balls located in each of the races spacing the flywheel axially and radially relative to the housing in lubricated bearing relation with the housing and flywheel recessed surfaces to prevent frictional interengagement and deterioration of the fluid.

5. In a rotary vibration damper of the character having a housing defining therewithin an annular chamber, the improvement which comprises a flywheel received in said chamber and having an annular tongue portion extending radially therefrom to define at its axially opposite sides with the housing a pair of annular grooves, and a plurality of balls of greater diameter than the radial and axial dimensions of the grooves disposed therein in bearing relation with the housing and flywheel to maintain relative axial and radial spacing therebetween and prevent frictional interengagement.

6. In a rotary vibration damper of the character having a housing defining therewithin an annular chamber uninterrupted along the inner radial wall thereof and receiving a damping fluid, the improvement which comprises a flywheel located in said chamber for rotation with the housing and having a central annular raised portion formed thereon defining with the housing a pair of axially spaced annular races, and a ring of continuously abutting ball elements received in each race bearing against the housing, flywheel and raised portion thereon and maintaining the flywheel and housing axially and radially spaced relative to one another to prevent frictional interengagement.

7. In a rotary vibration damper of the character having a ferrous housing defining therewithin an annular chamber receiving a damping fluid, the improvement which comprises a ferrous flywheel located in said chamber for rotation with the housing and having an annular neck portion centrally axially disposed in the chamber defining with the housing a pair of annular straight wall grooves, and a ring of continuously abutting rotatable ball members received in each groove in bearing relation with the housing, flywheel and neck portion thereof and providing therebetween annular spaces of equal dimensions surrounding the flywheel whereby said flywheel and housing are maintained out of frictional contact.

8. In combination in a torsional viscous vibration damper, a ferrous housing providing an annular flywheel chamber uninterrupted along the inner radial wall thereof, a ferrous flywheel in said chamber, said flywheel being formed along at least one diameter thereof with an annular raised portion providing with the housing a pair of annular axially spaced and generally rectangular pockets, a viscous silicone fluid in said chamber, and ferrous means in the pockets maintaining the flywheel out of direct contact with the walls of the housing defining said chamber.

9. In combination in a torsional viscous vibration damper, a ferrous housing providing an annular flywheel chamber uninterrupted along the inner radial wall thereof, a ferrous flywheel in said chamber, said flywheel being formed along at least one diameter thereof with an annular raised portion providing with the housing a pair of annular axially spaced and generally rectangular pockets, a viscous silicone fluid in said chamber, and rotatable ferrous ball members in the pockets maintaining the flywheel out of direct contact with the walls of the housing defining said chamber.

10. A viscous torsional vibration damper which comprises, a housing defining therein an annular inertia ring chamber and an inertia ring received in said housing chamber for rotation with said housing, said inertia ring having along one diameter thereof a pair of essentially straight wall recessed surfaces defining with the housing a pair of axially spaced annular races, a viscous damping fluid located in the chamber between said ring and said housing, said chamber having an uninterrupted inner radial wall, and a plurality of rotatable elements in closely packed relation one to another located in each of the races between the ring and housing and maintaining said ring and housing relatively axially and radially spaced to prevent frictional engagement therebetween, the housing being constructed of a material selected from the group consisting of ferrous, aluminum and magnesium materials, the inertia ring being constructed of a material selected from the group consisting of ferrous and bronze materials, and the rotatable elements being formed of a material selected from the group consisting of plastic and ferrous materials.

11. In combination in a torsional viscous vibration damper, a housing providing an annular flywheel chamber uninterrupted along the inner radial wall thereof, a flywheel in said chamber having along one diameter thereof a pair of essentially straight wall recessed surfaces defining with the housing a pair of axially spaced annular races, a viscous silicone fluid also in said chamber, and rotatable ball members in each of the races maintaining the flywheel out of direct contact with the walls of the housing defining said chamber, said housing being constructed of a material selected from the group consisting of ferrous, aluminum, and magnesium materials, the flywheel being constructed of a material selected from the group consisting of ferrous and bronze materials, and the ball members being formed of a material selected from the group consisting of ferrous and plastic materials.

References Cited in the file of this patent

UNITED STATES PATENTS

| | | |
|---|---|---|
| 1,969,755 | Kellogg | Aug. 14, 1934 |
| 2,013,109 | Reynolds | Sept. 3, 1935 |
| 2,113,390 | Zimmerman | Apr. 5, 1938 |
| 2,137,591 | Sarazin | Nov. 22, 1938 |
| 2,454,980 | Sobell | Nov. 30, 1948 |
| 2,514,136 | O'Connor | July 4, 1950 |
| 2,736,393 | O'Connor | Feb. 28, 1956 |
| 2,824,467 | O'Connor | Feb. 25, 1958 |

FOREIGN PATENTS

| | | |
|---|---|---|
| 736,808 | Great Britain | Sept. 14, 1955 |